Nov. 3, 1953

L. J. QUILLING 2,657,801

WATERMELON CRUSHER AND SEED SEPARATOR

Filed June 1, 1948

INVENTOR.
LESLIE J. QUILLING
BY Victor J. Evans &Co.

ATTORNEYS

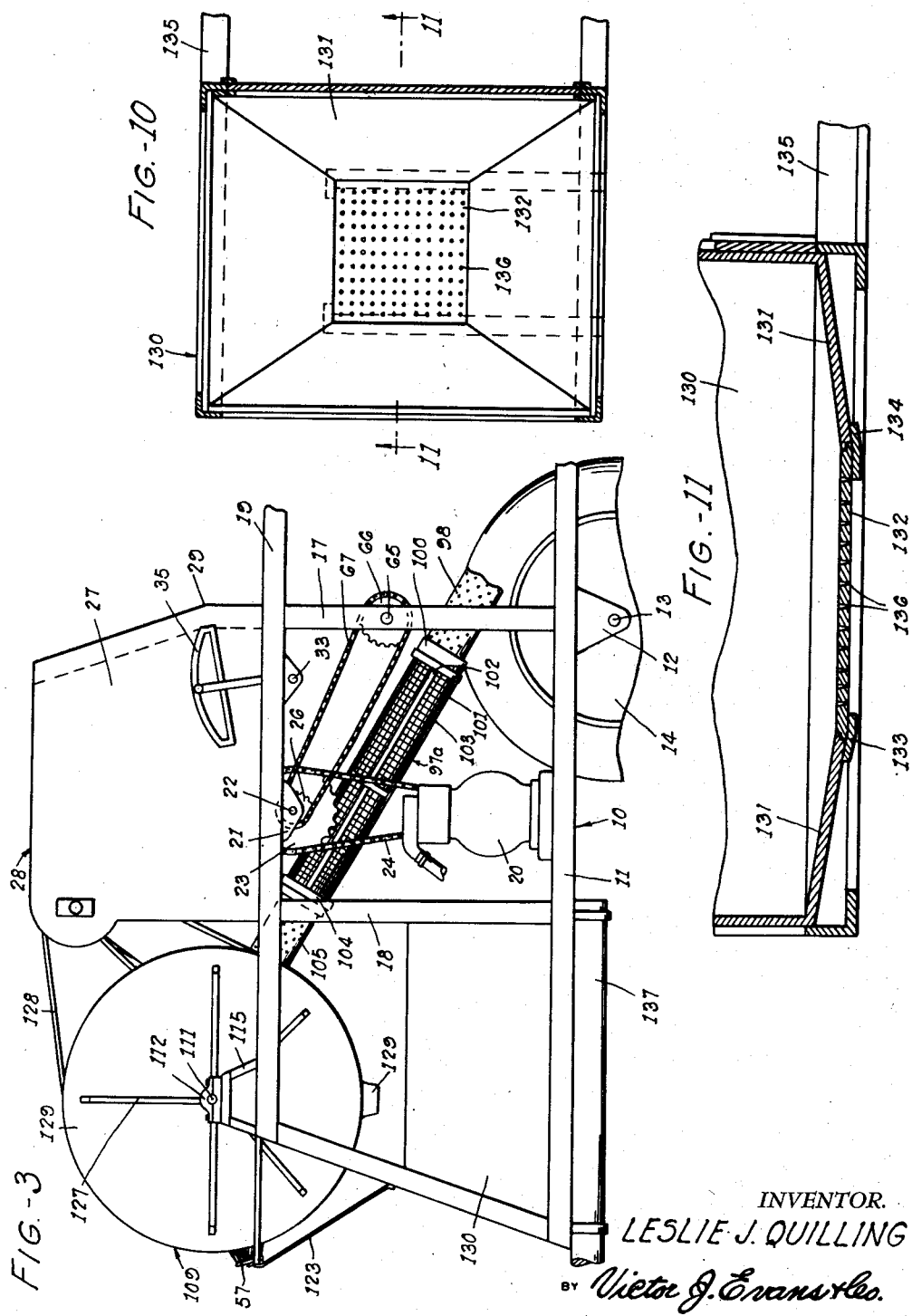

Nov. 3, 1953  L. J. QUILLING  2,657,801
WATERMELON CRUSHER AND SEED SEPARATOR
Filed June 1, 1948  5 Sheets-Sheet 3
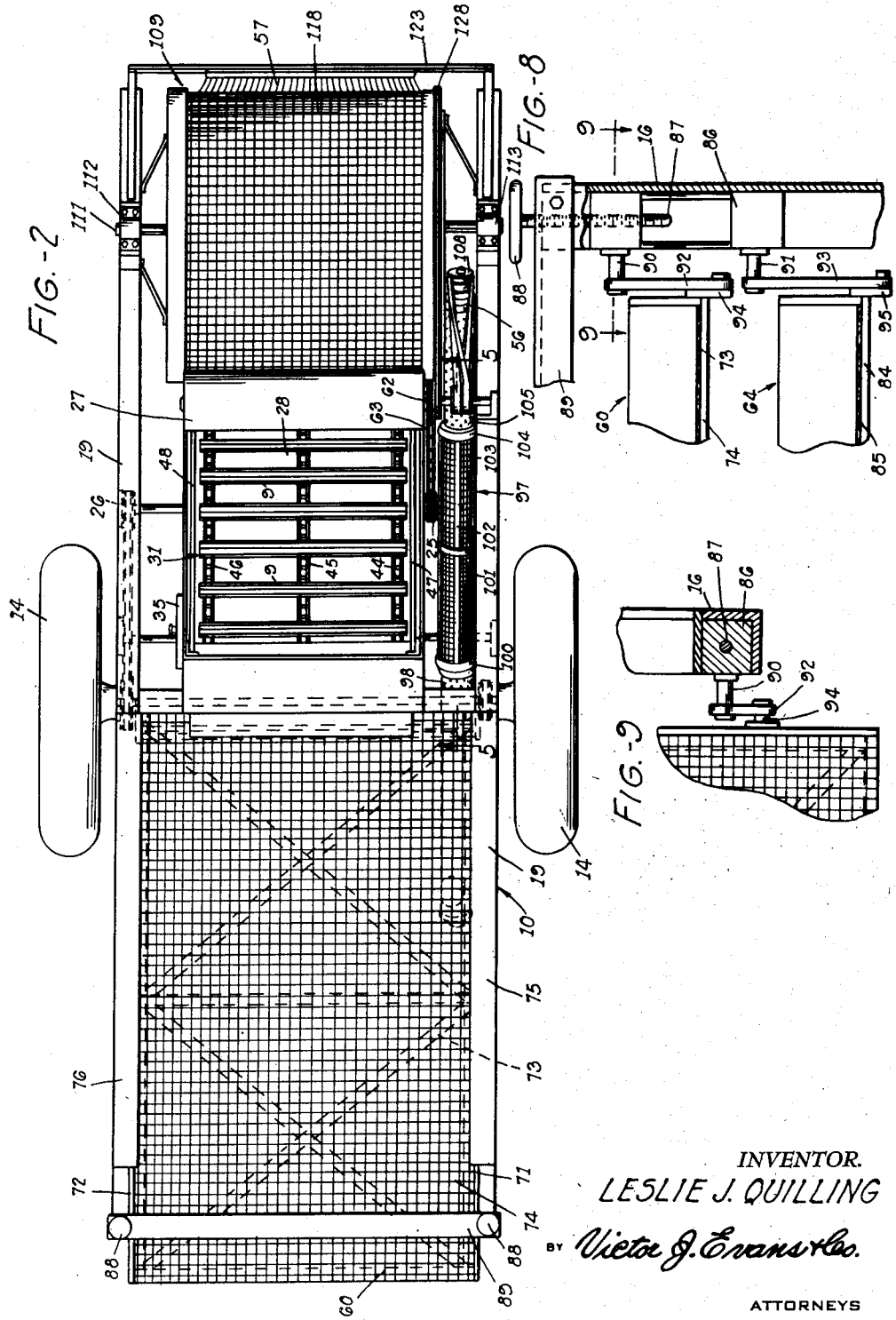
INVENTOR.
LESLIE J. QUILLING
BY *Victor J. Evans & Co.*
ATTORNEYS

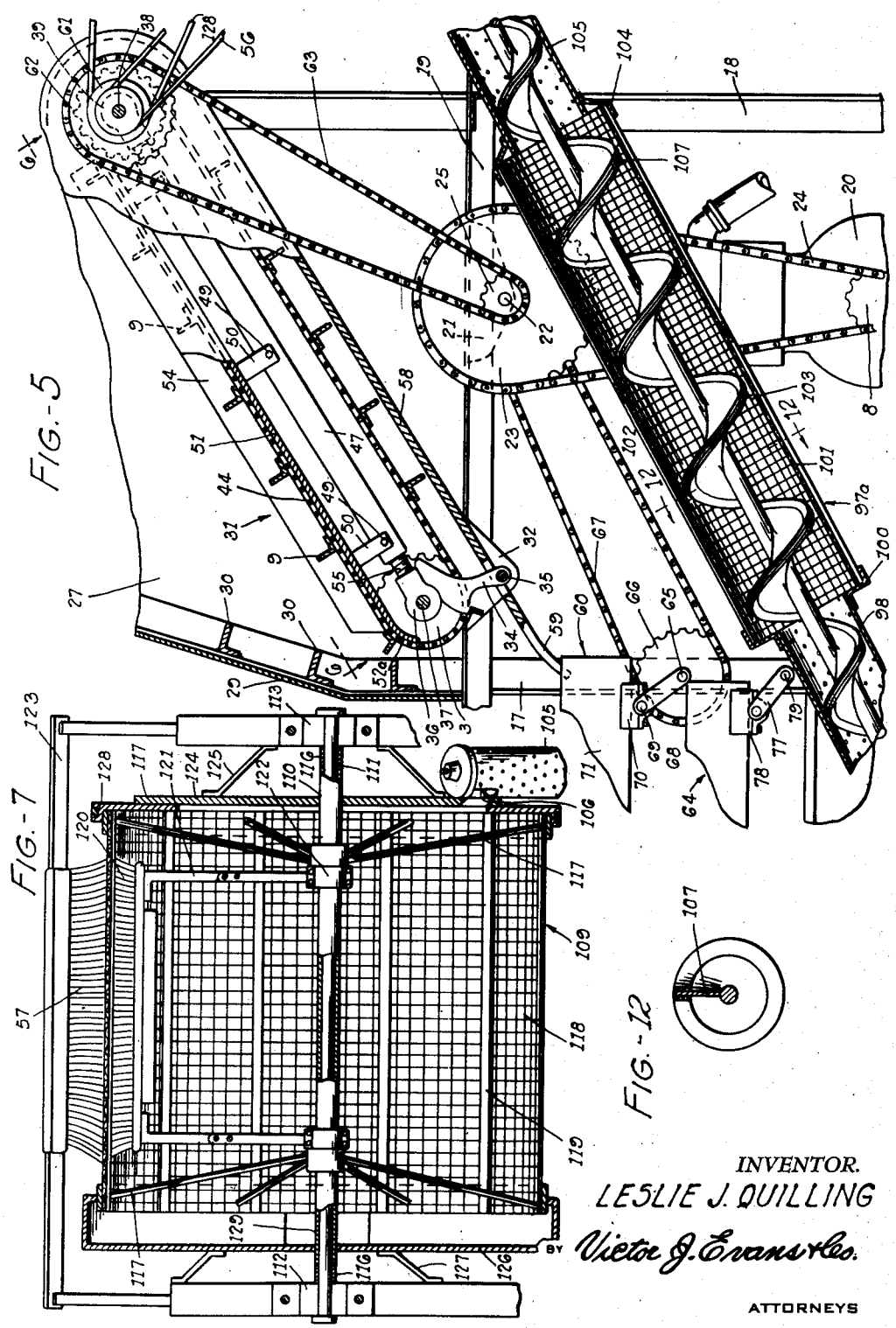

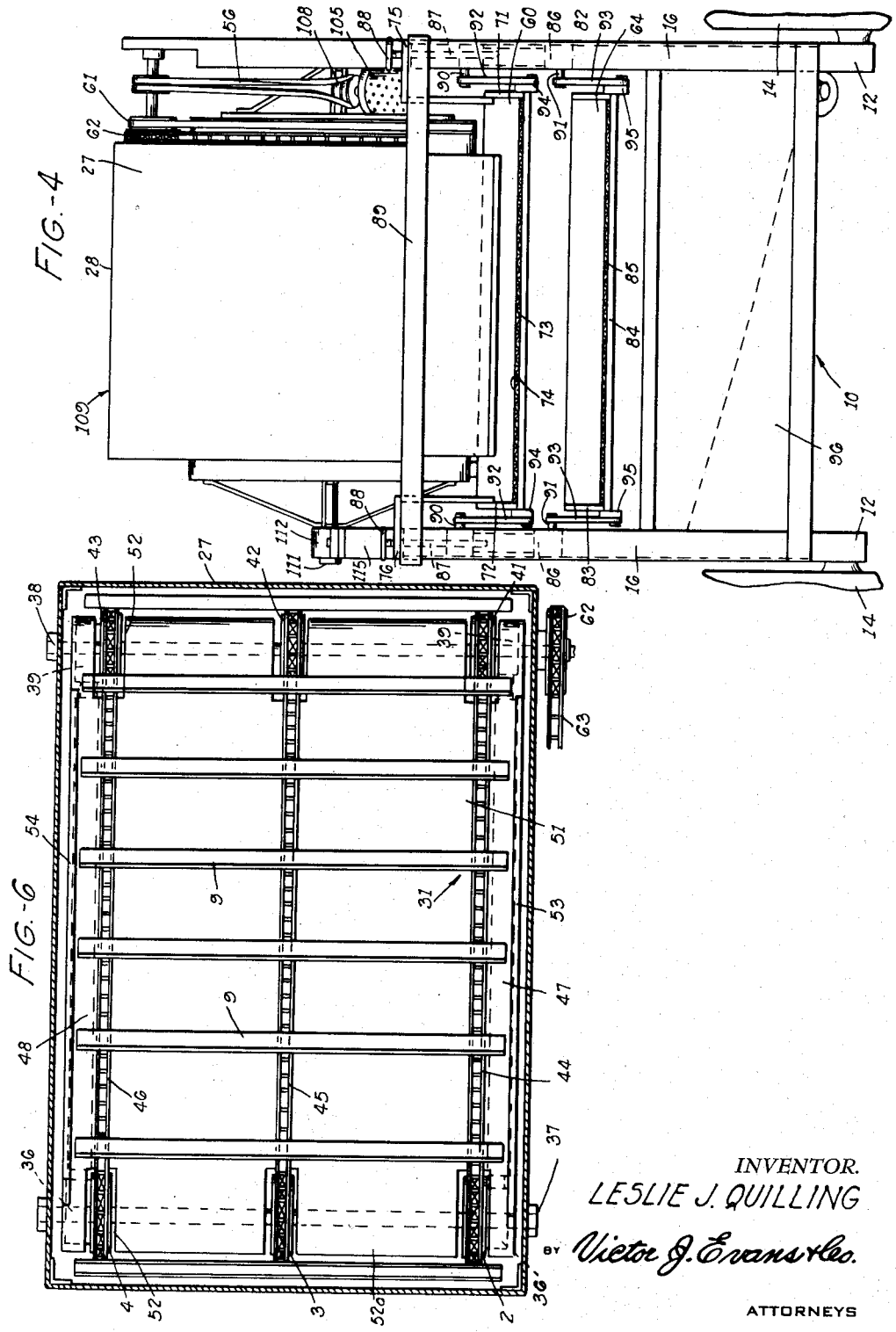

Patented Nov. 3, 1953

2,657,801

UNITED STATES PATENT OFFICE 2,657,801

WATERMELON CRUSHER AND SEED SEPARATOR

Leslie J. Quilling, Ringwood, Okla.

Application June 1, 1948, Serial No. 30,417

2 Claims. (Cl. 209—300)

This invention relates to a thresher, and more particularly to a thresher for separating the seeds from the pulp of watermelons.

An object of this invention is to provide a watermelon thresher wherein the watermelons are crushed, screened and treated in such a way that the seeds will be taken from the thresher free of pulp or other particles of the melon under treatment so that the seeds can be used for the purpose of planting.

Another object of the invention is to provide a watermelon thresher which is simple in structure, easy to manipulate, and highly efficient in action.

Other objects and advantages will become apparent from the following description.

An embodiment of the invention is illustrated by way of example in the accompanying drawings, wherein:

Figure 2 is a top plan view of the device of Figure 1;

Figure 3 is a longitudinal elevational view of the device and illustrating the forward portion of the machine;

Figure 4 is a rear elevational view of the device;

Figure 5 is a transverse elevational sectional view taken on the line 5—5 of Figure 2;

Figure 6 is a sectional view taken on the line 6—6 of Figure 5;

Figure 7 is a sectional view taken on the line 7—7 of Figure 1;

Figure 8 is a view showing certain constructional details of the device;

Figure 9 is a sectional view taken on the line 9—9 of Figure 8;

Figure 10 is a sectional view taken on the line 10—10 of Figure 1;

Figure 11 is a sectional view taken on the line 11—11 of Figure 10;

Figure 12 is a sectional view taken on the line 12—12 of Figure 5.

Figure 1:
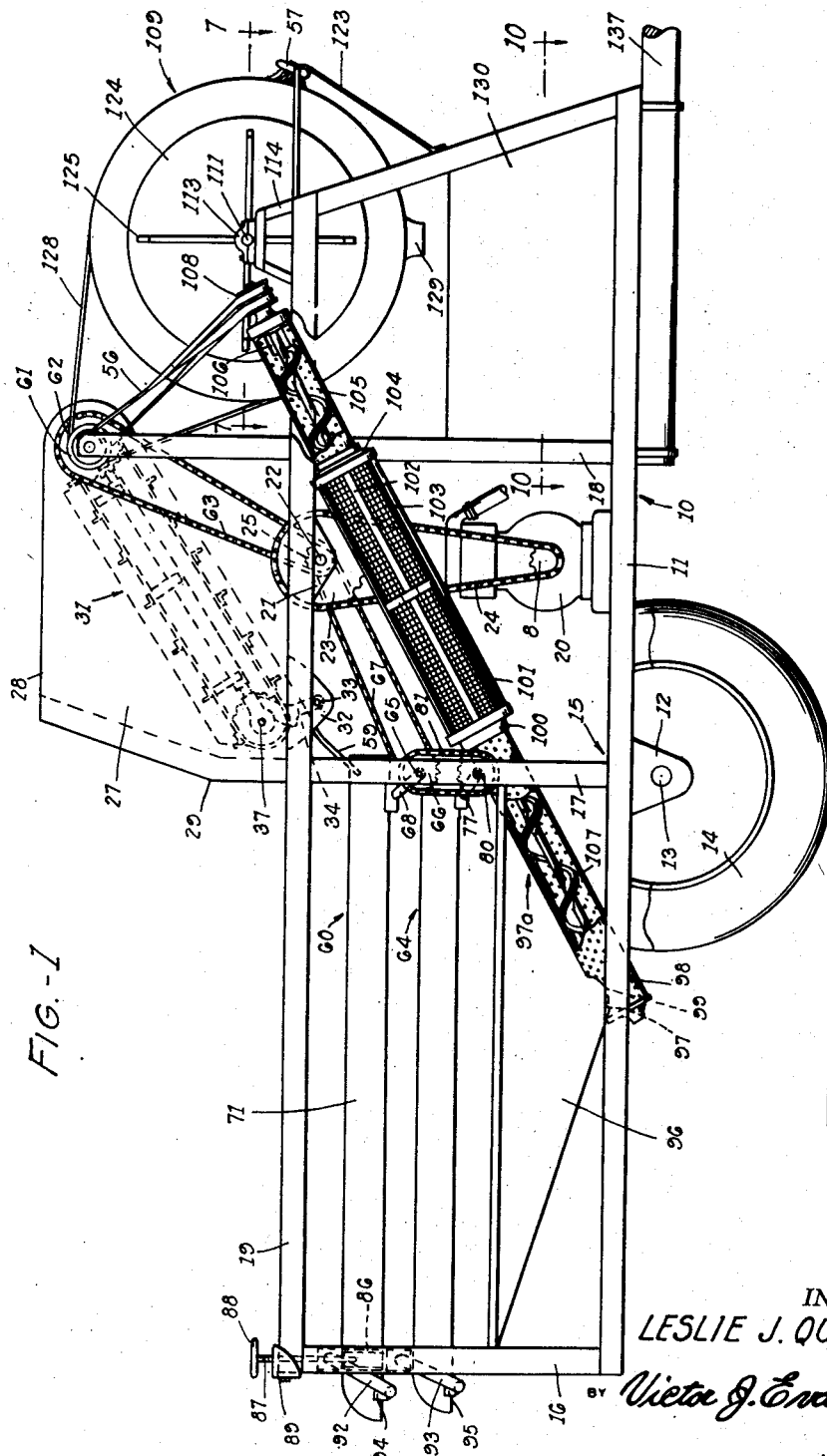
Figure 1 is a fragmental longitudinal elevational view of the watermelon thresher, according to the present invention.

In the drawings, the watermelon thresher is shown mounted on a trailer 10 having a base 11 and dependingly carried by the base 11 are the brackets 12 for rotatably supporting the horizontally disposed axle 13 therein. The axle 13 has rotatably supported on each end thereof a wheel 14, Figures 1, 2 and 3. Supported on the base 11 of the trailer 10 is the frame, generally indicated by the reference numeral 15 and including the vertically disposed spaced posts 16, 17, 18 projecting upwardly from the base 11 and secured thereto. Arranged in spaced, parallel, relation with respect to the base 11 are the pair of cross beams 19, said cross beams being secured to the upper ends of the posts 16, 17 and 18.

Supported on the base 11, intermediate the ends of the latter, is the power means for operating the watermelon thresher. The power means, Figures 1 and 3, embodies a conventional internal combustion engine 20 for rotating the drive gear 8. Positioned above the engine 20 and dependingly carried by the cross beam 19 is the bracket 21, the bracket 21 having the rotatable shaft 22 journaled therein. Keyed to shaft 22 is the sprocket 23 and trained over the sprocket 23 and the drive gear 8 is the endless chain 24. Arranged in abutting relation to each face of sprocket 23 and keyed to the shaft 22 is a first gear 25, Figure 5, and a second gear 26, Figure 3, for a purpose to be hereinafter described.

Supported on the cross beams 19 of the frame 15 and positioned above the engine 20 is the hopper 27 having an open mouth 28 for the ingress therethrough of watermelons to be threshed. The hopper 27 is provided with a sloping wall 29 and arranged in spaced, parallel relation on the inside of the hopper 27 are the angle irons 30, said angle irons being secured to the wall 29 by welding, Figure 5. Positioned within the hopper 27 is the crusher, indicated generally by the reference numeral 31. The crusher 31, Figures 1, 3, 5 and 6, embodies the bracket 32 secured to the cross beam 19 and journaled in the bracket 32 is the pin 33 carrying the cam 34 positioned within the hopper 27 and the cam adjustment lever 35 arranged exteriorly of the hopper 27. Supported on the cam 34 is the bearing 36 and rotatably mounted in the bearing 36 is the horizontally disposed lower shaft 37. Arranged in spaced, parallel relation above the lower shaft 37 is the upper shaft 38 which is rotatably mounted in bearings 39, said upper shaft being fixedly secured to the hopper 27, while the lower shaft 37 is movable towards and away from the wall 29 of the hopper 27 in response to movement of the cam adjustment lever 35 for varying the distance between the wall 29 and the crusher 31, when different size watermelons are being threshed. Keyed to the lower shaft 37 of the crusher 31 are three spaced sprockets 2, 3 and 4, and keyed to the upper shaft 38 of the crusher 31 are three similar spaced sprockets 41, 42 and 43, Figure 6. The spaced sprockets 2, 3 and 4 are operatively connected to the complemental spaced sprockets 41, 42 and 43 by the respective endless chains 44, 45 and 46, there being a plurality of spaced, parallel angle irons 9 welded on said chains. On each side of the crusher 31 are side bars 47 and 48 having their ends secured to the respective bearings 36 and 39. Projecting from the side bars 47 and 48 and secured thereto by rivets 49 are a plurality of flanges 50 for supporting the drag pan 51. The drag pan 51 is provided with slots 52 for embracingly receiving the respective sprockets of the lower shaft 37 and upper shaft 38. The drag pan 51 has a lip 52 on its lower end and upstanding side walls 53 and 54 for guiding watermelons through the crusher 31. Operatively connecting the upper shaft 38 to the lower shaft 37 is a screw 55 having its ends connected to the shafts 37 and 38 for moving the latter towards and away from each other. Arranged below the crusher 31 and secured to the hopper 27 is the guide plate 58 having the lip 59 on its lower end for guiding the crushed watermelons on to the shaker pan 60. The upper shaft 38 is provided on one end thereof with a pulley 61 for a purpose to be hereinafter described and keyed to upper shaft 38 and arranged intermediate the pulley 61 and the sprocket 41 is the sprocket 62 which is connected to the gear 25 by the chain 63 for driving the crusher.

The crushed watermelon, after leaving the crusher 31, is directed on to the first shaker pan 60, Figures 1, 2 and 5. For actuating the first shaker pan 60 and the second shaker pan 64 arranged in spaced relation below the pan 60, a horizontally disposed pin 65 is rotatably secured to the post 17 and carried by the pin 65 is the sprocket 66, the sprocket 66 being driven by the chain 67 which is trained over the gear 26. Secured to the pin 65 is the arm 68 and carried by the upper end of the arm 68 is pin 69 rotatably mounted in the bearing 70, the bearing 70 being dependingly carried by the shaker pan 60. The first or upper shaker pan 60 includes spaced, parallel side walls 71 and 72, a plurality of bottom bars 73 arranged in criss-cross relation, and a heavy mesh screen 74 supported on said bottom bars. A pan guard 75 and 76 is arranged on each side of the pan 60 for protection against the vibrating pan 60. The pan 64, spaced below the upper pan 60 is caused to vibrate by means of the arm 77 having one end rotatably mounted in the bearing 78 which is carried by the pan 64. The other end of the arm 77 is keyed to the pin 79, the pin 79 being rotated by the sprocket 80 which is spaced below the sprocket 66 and connected to the latter by the endless chain 81. The shaker pan 64, Figure 4, has a construction similar to the shaker pan 60 and embodies the pair of spaced, parallel, side walls 82 and 83, the bottom supporting bars 84 and the heavy mesh screen 85 supported on the bars 84. The respective rear ends of the shaker pans 60 and 64 are mounted for vertical adjustment relative to the ground, as shown in Figures 1, 4, 8 and 9 by means of the adjusting block 86 which is mounted for vertical sliding movement in each of the rear posts 16 fabricated of angle iron. Threadedly engaging the top of the adjusting block 86 is the adjusting screw 87 having a handle 88 therein. The screw 87 extends through an aperture in the cross bar 89 which interconnects the respective tops of the posts 16. Carried by the movable adjusting blocks 86 are a pair of horizontally disposed, spaced, parallel, pins 90 and 91 which dependingly carry the arms 92 and 93 and respectively, the arms 92 and 93 being connected to the complemental depending lugs 94 and 95 of the pans 60 and 64, to thereby raise or lower the latter when the screw 87 is actuated. Positioned below the pans 60 and 64 and carried by the frame 15 is the seed catch basin 96 having tapering side walls for guiding the seeds deposited therein towards the opening 97 in the bottom of the seed catch basin 96.

The seeds collected in the seed catch basin 96 are cleaned and conveyed from the basin 96 by the auger cleaner, Figures 1, 2, 3 and 5 and indicated generally by the reference numeral 97 and includes the lower tubular housing 98 having an opening 99 therein for the reception of the seeds from the basin 96. The housing 98 is perforated for the egress therethrough of some of the juice of the watermelon. Arranged in registry with the upper end of the lower housing 98 and secured thereto by the ring 100 is the center section 101. The center section 101 embodies the longitudinally extending bars 102 for supporting the screen 103 so that any immature seed being conveyed by the auger cleaner 97 will be ejected through the screen 103. Positioned on the upper end of the center section 101 is the reducing cone 104 for attaching the upper perforated casing 105 to the center section 101, the top end of the upper casing 105 being provided with an opening 106, Figure 7, for the egress therethrough of the seeds. Rotatably mounted in the auger cleaner 97 and extending longitudinally thereof is the steel auger 107 having a rubber facing thereon. The auger 107 has on its upper end the pulley 108 which is driven by the endless belt 56 trained over the pulley 61 of the shaft 38.

The seed conveyed by the auger cleaner 97 passes through the opening 106 into the tumbler or recleaner indicated at 109, Figures 1, 2, 3, 4 and 7. The recleaner 109 has a tubular casing 110 having a shaft 111 rotatably mounted therein. The ends of the shaft 111 seat in bearings 112 and 113 supported on the respective brackets 114 and 115 mounted on the cross beams 19 and guide bearings 116 rotatably space the ends of the casing 110 from the brackets 114 and 115. Projecting radially from the casing 110 and secured thereto are the bars 117 which have their ends secured to the screen 118. Positioned within the tumbler 109 are the rods 119 which brace the screen 118. The seeds discharged into the tumbler 109 are cleaned by means of the pair of brushes, the brush 120 being positioned within the tumbler 109 and rotatably mounted on the casing 110 by the arms 121 and brackets 122 secured thereto. The brush 57 is fixed in position adjacent the outer face of the tumbler 109 and supported on the bracket 123. One end of the tumbler 109 is closed by the end wall 124 which is supported by the arms 125 while the other end of the tumbler is closed by the end plate 126 supported by the arms 127. The tumbler is rotated by means of the endless belt 128, the belt 128 being connected to the pulley 61. Disposed below the tumbler 109 is the spout 129 for the egress therethrough of the cleaned seeds into the seed bin 130.

The seed bin 130, Figures 1, 3, 10 and 11, includes the tapering side walls 131, and the bottom gate 132 slidably supported on the bars 133 and 134, the gate 132 being provided with the handle 135 for actuating the gate 132. The gate 132 of the seed bin 130 has a plurality of apertures 136 extending therethrough for draining off the juice from the watermelon seeds.

The watermelon thresher mounted on the trailer 10 is mobile and adapted to be towed by means of the tubular tongue hitch 137, Figures 1, 3 and 12.

The operation of the watermelon thresher is as follows:

The watermelons to be seeded are fed to the crusher 31 through the open mouth 28 of the hopper 27, the crusher 31 being actuated by the engine 20 which drives the sprocket 23 keyed to the shaft 22. The upper shaft 38 of the crusher 31 is driven by the endless chain 63 trained over the gear 25 and sprocket 62. The crusher 31 is inclined relative to the horizontal and embodies an upper shaft 38 and a lower shaft 37 operatively connected thereto by means of sprockets and endless chains on the last-named sprockets so that the lower shaft 37 is driven from the upper shaft. Carried by the endless chains of the crusher 31 are a plurality of spaced angle irons 9 which coact with the fixed angle irons 30 on the tapering side wall 29 of the hopper 27 to crush the watermelons. The crushed melons are guided on to the lip 59 of the guide plate 59 and then onto the first shaker pan 60.

The shaker pan 60 is caused to vibrate by means of the arm 68 rotatably mounted in bearing 70, the arm 68 being pivoted by the rotary motion of the pin 65 driven by the sprocket 66. Crushed melon is fed onto the pan 60 where a partial separation of the pulp and seeds takes place due to the vibration of the pan 60, with the seeds passing downwardly through the screen 74 of the pan 60 while the remainder of the melon moves toward the rear of the thresher. The partially separated seeds are received on the vibrating shaker pan 64 disposed below the shaker pan 60 and actuated by a means similar to the means for vibrating the pan 60, as previously described. A further separation of the seeds from the melon is effected on the shaker pan 64, with the seeds passing downwardly through the screen of the pan 64 and the pulp moving towards the rear of the thresher. The rear end of each of the pans 60 and 64 is adjustable relative to the ground, the adjusting means including the screw 87 engaging the adjusting block 86 which is slidably mounted in the posts 16 and secured to the respective pans 60 and 64 by the arms 92 and 93. The seeds and juice passing downwardly through the screen 74 are collected in the seed catch basin 96 and guided toward the opening 97 and into the registering opening 99 of the inclined separator. The seeds and juice are conveyed by the steel auger 107 through the lower perforated housing 98 where part of the juice will be drained from the seeds. As the seeds are further conveyed along the cleaner 97, the seeds pass over the screen 103 of the center section 101 where the immature seeds will be ejected, and finally the seeds are carried through the upper casing 105 and pass through the opening 106 into the tumbler or recleaner 109. The seeds are cleaned in the rotating tumbler 109 by the coaction of the brushes 57 and 120. The cleaned seeds then pass through the spout 129 and are collected in the seed bin 130 where the remaining juice is drained therefrom through the apertures 136 in the gate 132.

Having described the invention, what is claimed as new is:

1. In a watermelon crusher and seed separator, a frame, an inclined separator supported by said frame and including a cylindrical housing comprising a lower perforated section having an opening therein for the reception of watermelon seeds and stock, said perforations therein to allow juice to pass therethrough, a center section of enlarged diameter arranged in registry with the upper end of said lower section and secured thereto, said center section embodying a plurality of spaced parallel longitudinally extending bars, an annular screen wall supported by said bars, said screen wall having openings of a size to permit immature seed to pass therethrough and to retain the mature seeds therein, a reducing cone section positioned on the upper end of said center section, an upper perforated section connected to said reducing cone and provided with an opening for the egress therethrough of seeds, and a screw member rotatably mounted in said separator and extending longitudinally therethrough and adapted to be connected to a power source, said screw member having a rubber facing thereon to move the material upwardly through said housing.

2. The apparatus as described in claim 1, and further including a recleaner for receiving the seeds from the upper perforated section.

LESLIE J. QUILLING.

References Cited in the file of this patent

UNITED STATES PATENTS

| Number | Name | Date |
|---|---|---|
| 359,044 | Welker et al. | Mar. 8, 1887 |
| 408,243 | Ladd | Aug. 6, 1889 |
| 417,885 | Sanguinetti et al. | Dec. 24, 1889 |
| 469,026 | Hubert | Feb. 16, 1892 |
| 492,644 | Vickers | Feb. 28, 1893 |
| 612,744 | Methven et al. | Oct. 18, 1898 |
| 772,691 | Chase | Oct. 18, 1904 |
| 840,296 | Caldwell | Jan. 1, 1907 |
| 960,577 | Nichols | June 7, 1910 |
| 1,185,715 | Ridgely | June 6, 1916 |
| 1,307,692 | Northrop | June 24, 1919 |
| 1,320,968 | Baudendistel | Nov. 4, 1919 |
| 1,550,423 | Brass | Aug. 18, 1925 |
| 1,789,444 | Methewson | Jan. 20, 1931 |
| 2,360,964 | Moroni | Oct. 24, 1944 |
| 2,365,077 | Hertzler et al. | Dec. 12, 1944 |
| 2,429,488 | Rodery | Oct. 21, 1947 |

FOREIGN PATENTS

| Number | Country | Date |
|---|---|---|
| 173,651 | Canada | Dec. 5, 1916 |
| 798,896 | France | May 28, 1936 |